United States Patent [19]

Meuwese et al.

[11] Patent Number: 5,397,185
[45] Date of Patent: Mar. 14, 1995

[54] DEVICE FOR THE AXIAL SUPPORT OF A ROTATABLE BODY, AND POSITIONING DEVICE PROVIDED WITH SUCH A DEVICE

[75] Inventors: Mark T. Meuwese; Jakob Vijfvinkel; Cornelis J. M. Naus, all of Eindhoven, Netherlands

[73] Assignee: U.S. Philips Corporation, New York, N.Y.

[21] Appl. No.: 161,951

[22] Filed: Dec. 2, 1993

[30] Foreign Application Priority Data

Dec. 15, 1992 [EP] European Pat. Off. ............ 92203926

[51] Int. Cl.$^6$ ............................................ F16C 32/06
[52] U.S. Cl. ........................................ 384/119; 384/103; 384/107; 384/215; 384/12
[58] Field of Search ............... 384/119, 215, 107, 103, 384/121, 195, 12

[56] References Cited

U.S. PATENT DOCUMENTS

| | | | |
|---|---|---|---|
| 3,152,845 | 10/1964 | Ertaud et al. | 384/121 |
| 3,537,765 | 11/1970 | Lagerwey | 384/195 |
| 3,841,720 | 10/1974 | Kovach et al. | |
| 5,161,901 | 11/1992 | Dona et al. | 384/215 |

Primary Examiner—Lenard A. Footland
Attorney, Agent, or Firm—Brian J. Wieghaus

[57] ABSTRACT

A device (1) for supporting a rotatable body (3) in a direction parallel to an axis of rotation (5) of the body (3). The device (1) comprises a support member (17) with a fluid bearing (21) which maintains a bearing gap (23) between a bearing surface (15) of the body (3) extending perpendicular to the axis of rotation (5) and a bearing surface (19) of the support member (17) extending perpendicular to the axis of rotation (5) during operation. Manufacturing tolerances may lead to deviations from perpendicularity of the bearing surfaces (15, 19) relative to the axis of rotation (5), which deviations cause an undesirable vibration of the body (3) parallel to the axis of rotation (5) during rotation of the body (3). This vibration is prevented in that the support member (17) is coupled to a frame (11) of the device (1) by means of an elastically deformable coupling member (25), whereby the bearing surface (19) is pivotable about two mutually perpendicular pivot axes (27, 29) which intersect in a point of intersection (31) of the axis of rotation (5) and the bearing surface (19). The point of intersection (31) of the axis of rotation (5), the pivot axes (27, 29) and the bearing surface (19) is defined in relation to the axis of rotation by means of the coupling member (25). The device (1) is used in a positioning device (127) for machining a rotatable workpiece (171) by means of a tool (149), during which the workpiece (171) is supported parallel to the axis of rotation (5) by the device (1).

20 Claims, 6 Drawing Sheets

DEVICE FOR THE AXIAL SUPPORT OF A ROTATABLE BODY, AND POSITIONING DEVICE PROVIDED WITH SUCH A DEVICE

BACKGROUND OF THE INVENTION

The invention relates to a device for supporting a rotatable body in a direction parallel to an axis of rotation of the body by means of a fluid bearing comprising two cooperating bearing surfaces which extend transverse to the axis of rotation and which are present on the body and on a support member of the device, respectively, one of the bearing surfaces being pivotable about two mutually perpendicular pivot axes which extend perpendicular to the axis of rotation and which intersect one another in a point of intersection of the axis of rotation and the relevant beating surface.

The invention also relates to a positioning device provided with a device according to the invention.

A device of the kind mentioned in the opening paragraph is known from U.S. Pat. No. 3,841,720. The known device comprises a rotatable shaft which is supported in the axial direction by a spiral groove bearing, the bearing surface of the support member being provided with a pattern of spiralling grooves. The support member is pivotable about the two pivot axes through the use of a support surface in the shape of a sphere segment which is rotatable in a cavity of a frame of the device corresponding to the support surface and whose center coincides with the point of intersection of the axis of rotation and the beating surface of the support member. The use of the support surface in the shape of a sphere segment renders the bearing surface of the support member self-adjusting, i.e. the beating surface of the support member automatically adjusts itself to the bearing surface of the shaft, so that the two bearing surfaces lie in parallel planes during operation.

Owing to manufacturing tolerances, the bearing surface of the shaft often is not exactly perpendicular to the axis of rotation. This deviation from perpendicularity of the bearing surface, which is difficult to avoid, causes a slight, comparatively fast swinging movement of the shaft bearing surface relative to an axis perpendicular to the axis of rotation during the rotation of the shaft. A disadvantage of the known device is that the beating surface of the support member has a difficulty in following the swinging movement of the shaft bearing surface because the self-adjusting capability of the bearing surface of the support member is limited by the friction and the accompanying hysteresis between the support surface in the shape of a sphere segment and the said cavity of the frame. An undesirable vibration of the shaft in axial direction arises from this.

SUMMARY OF THE INVENTION

It is an object of the invention to provide a device of the kind mentioned in the opening paragraph in which the self-adjusting capability of the pivotable bearing surface is improved, so that the pivotable bearing surface can readily follow the said swinging movement and the axial vibration of the rotatable body is prevented as much as possible.

The device according to the invention is for this purpose characterized in that the bearing surface is pivotable by means of an elastically deformable coupling member, the point of intersection of the axis of rotation, the pivot axes and the bearing surface being defined in relation to the axis of rotation by means of the coupling member. Owing to the use of the elastically deformable coupling member, the bearing surface experiences exclusively elastic deformation forces from the coupling member as a result of the pivoting movement, while frictional or damping forces are avoided. The pivoting movement of the bearing surface as a result is substantially free from hysteresis, so that the bearing surface can follow the said swinging movement substantially without time delay. Since the position of the point of intersection of the axis of rotation, the pivot axes and the bearing surface in relation to the axis of rotation has been defined, the position of the body in the direction of the axis of rotation is not influenced by the pivoting movement of the beating surface, and a vibration of the body in axial direction is avoided.

A special embodiment of the device according to the invention, in which the pivot axes have a position relative to the axis of rotation which is determined in an accurate and simple manner, is characterized in that the pivot axes are defined by elastic hinges of the coupling member.

A further embodiment of the device according to the invention is characterized in that the coupling member acts as two coupled four-rod mechanisms, the two pivot axes being each defined by a separate four-rod mechanism which extends in a plane perpendicular to the corresponding pivot axis and is provided with four elastic hinges each having a hinge axis extending parallel to the corresponding pivot axis, while the hinges of each four-rod mechanism, seen in the relevant plane, are arranged according to the angles of a parallelogram whose non-parallel sides have a virtual point of intersection which coincides with the point of intersection of the axis of rotation and the bearing surface. The coupling member constructed in this manner has a high torsional stiffness relative to the axis of rotation. In addition, the positions of the two pivot axes which pass through the virtual point of intersection of the non-parallel sides of the said parallelograms are defined in a simple manner.

A yet further embodiment of the device according to the invention is characterized in that the four-rod mechanisms are arranged mutually crosswise, while the hinges of the two four-rod mechanisms situated on the base lines of the parallelograms and the hinges of the two four-rod mechanisms remote from the base lines are arranged in two respective parallel planes which extend perpendicular to the axis of rotation, while a core is present between the four-rod mechanisms which connects a bridge of one of the four-rod mechanisms arranged near the base line with a bridge of the other four-rod mechanism situated remote from the base line. The coupling member constructed in this way can be readily manufactured from one piece of material through the provision of drilled holes and incisions.

A special embodiment of the device according to the invention, in which the pivot axes also have an accurately defined position relative to the axis of rotation, is characterized in that the coupling member comprises three elastically deformable rods which have a virtual point of intersection which coincides with the point of intersection of the axis of rotation and the beating surface.

A further embodiment of the device in accordance with the invention is characterized in that the rotatable body is prestressed in the direction parallel to the axis of rotation by means of a further fluid bearing with a bearing surface which is present on a further support member of the device, while the support member and the further support member are arranged on either side of a plate-shaped bearing part of the body extending perpendicular to the axis of rotation and are coupled by means of a flexible tension rod.

Prestressing the rotatable body by means of the fluid bearing of the said further support member provides an increased stiffness of the device in the direction parallel to the axis of rotation.

A positioning device in which the properties of the device according to the invention used therein are particularly effective is characterized in that the positioning device is provided with a slide which is movable parallel to an X-direction and comprises a holder for a tool, and with a shaft which extends parallel to a Y-direction perpendicular to the X-direction and which is rotatable about an axis of rotation directed parallel to the Y-direction, which shaft is supported parallel to the Y-direction by means of the said device and is displaceable parallel to the Y-direction together with the device, while the shaft is provided with a holder for a workpiece adjacent an end facing the slide.

BRIEF DESCRIPTION OF THE DRAWINGS

The invention will be explained in more detail below with reference to the drawing, in which FIG. 3a shows a coupling member of the device of FIG. 1 or 2, FIG. 3b schematically shows the coupling member of FIG. 3a, FIG. 3c is a plan view of the coupling member of FIG. 3a.

FIG. 3d is a side elevation of the coupling member of FIG. 3a,

DESCRIPTION OF THE PREFERRED EMBODIMENTS

Figure 1:
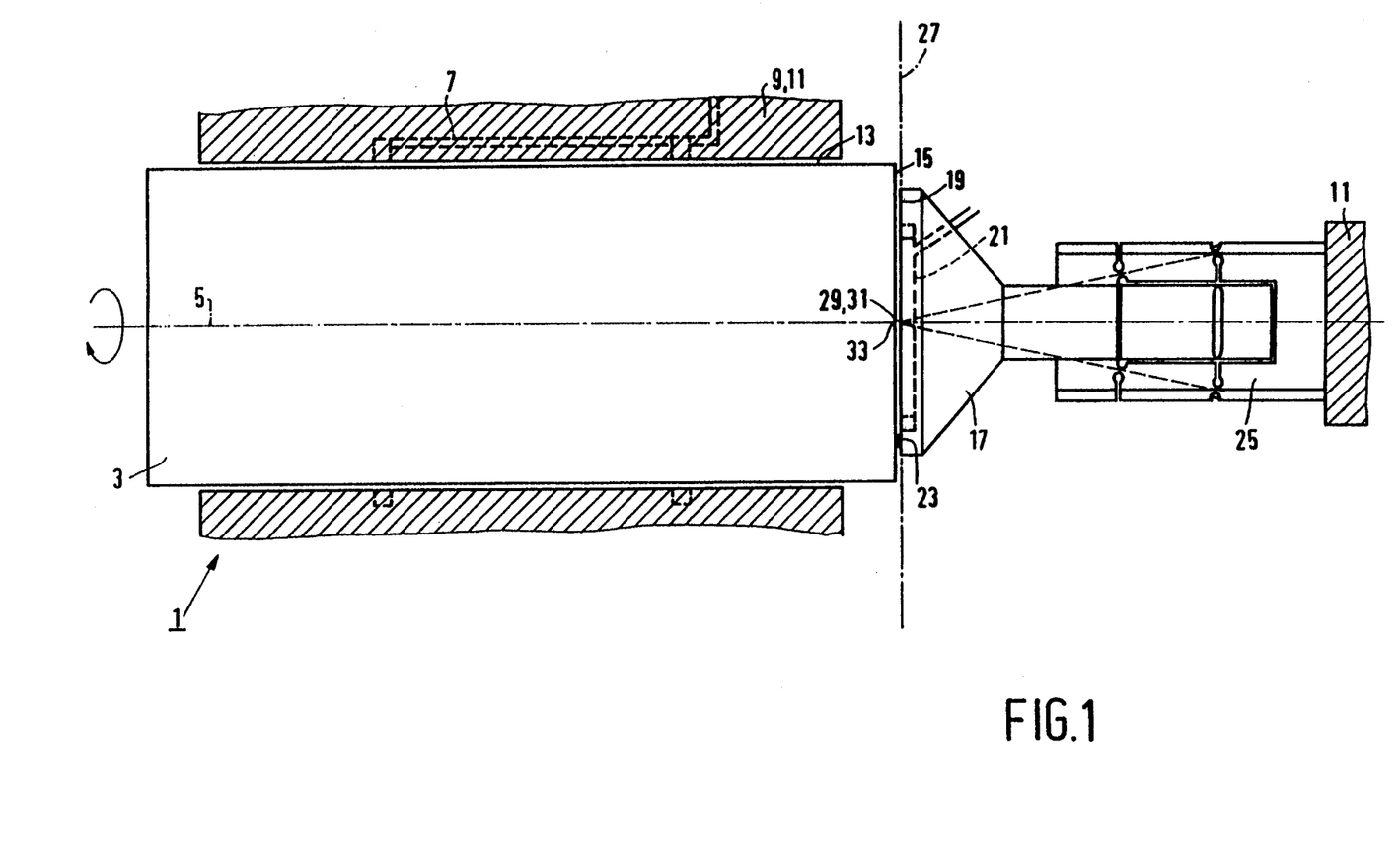
FIG. 1 shows a first embodiment of a device according to the invention for supporting a rotatable body in a direction parallel to an axis of rotation of the body.

The first embodiment of the device 1 shown in FIG. 1 comprises a metal shaft 3 which is rotatable about an axis of rotation 5 by means of a drive unit not shown in any detail in the Fig. The shaft 3 is supported in radial direction relative to the axis of rotation 5 by means of a static fluid bearing 7 diagrammatically shown in FIG. 1 which is arranged in a metal bearing block 9 of a frame 11 of the device 1 and which maintains a bearing gap 13 between the shaft 3 and the bearing block 9 during operation.

Adjacent an end, the shaft 3 is provided with a bearing surface 15 which extends substantially perpendicular to the axis of rotation 5. The device 1 is further provided with a metal support member 17 which is constructed as a so-called aerostatically supported foot. The support member 17 comprises a bearing surface 19, which also extends substantially perpendicular to the axis of rotation 5 and which is to cooperate with the bearing surface 15 of the shaft 3, and a static fluid bearing 21 diagrammatically shown in FIG. 1 which maintains a bearing gap 23 between the bearing surfaces 15 and 19 during operation. The shaft 3 is supported in an axial direction parallel to the axis of rotation 5 by means of the support member 17 and the static fluid bearing 21. The shaft 3 is prestressed in axial direction in a manner known per se which is not shown in any detail in FIG. 1, for example, by means of magnets or a vacuum chamber.

When the bearing surface 15 of the shaft 3 and the bearing surface 19 of the support member 17 are manufactured, a deviation from perpendicularity of the bearing surface 15 relative to the center line of the shaft 3 and of the bearing surface 19 relative to the center line of the support member 17 arises, which is difficult to avoid and results from manufacturing tolerances. A deviation in the planeness of the bearing surfaces 15 and 19 caused by manufacturing tolerances is comparatively small in practice compared with the said deviation from perpendicularity. The deviation from perpendicularity of the bearing surface 15 of the shaft 3 causes a slight swinging movement of the bearing surface 15 relative to an axis perpendicular to the axis of rotation 5 with a frequency corresponding to the rotation frequency of the shaft 3 during the rotation of the shaft 3. To prevent an axial vibration of the shaft 3 as a result of this swinging movement of the bearing surface 15, the device 1 is provided with an elastically deformable metal coupling 25 as shown in FIG. 1. As will become apparent below, the support member 17 is pivotable about two mutually perpendicular pivot axes 27 and 29, both extending perpendicular to the axis of rotation 5, through the use of the coupling member 25, while a point of intersection of the pivot axes 27 and 29 coincides with a point of intersection 31 of the axis of rotation 5 and the bearing surface 19. The bearing surface 19 of the support member 17 is self-adjusting in this manner, i.e. the bearing surface 19 automatically adjusts itself to the beating surface 15 of the shaft 3 and the bearing surfaces 15 and 19 lie in parallel planes during operation. Since the pivot axes 27 and 29 pass through the point of intersection 31, the position of the point of intersection 31 on the axis of rotation 5 is not affected by pivoting movements of the support member 17, so that also the position of the point of intersection 33 of the axis of rotation 5 and the bearing surface 15 of the shaft 3 is not affected, and the shaft 3 will not perform an axial vibration as a result of pivoting of the support member 17.

As is shown in FIGS. 3a to 3d, the coupling member 25 acts as two coupled four-rod mechanisms which are mutually arranged as two interlocking chain links. The coupling member 25 comprises a first and a second rod 35, 37 which have a common center plane extending perpendicular to the pivot axis 27, and a third and a fourth rod 39, 41 which have a common center plane extending perpendicular to the pivot axis 29. The two pairs of rods 35, 37 and 39, 41 are arranged cross-wise around a bridge portion 43 of the coupling member 25 which is only partly visible in FIGS. 3a, 3c and 3d and which is depicted diagrammatically in FIG. 3b.

Figure 3A:
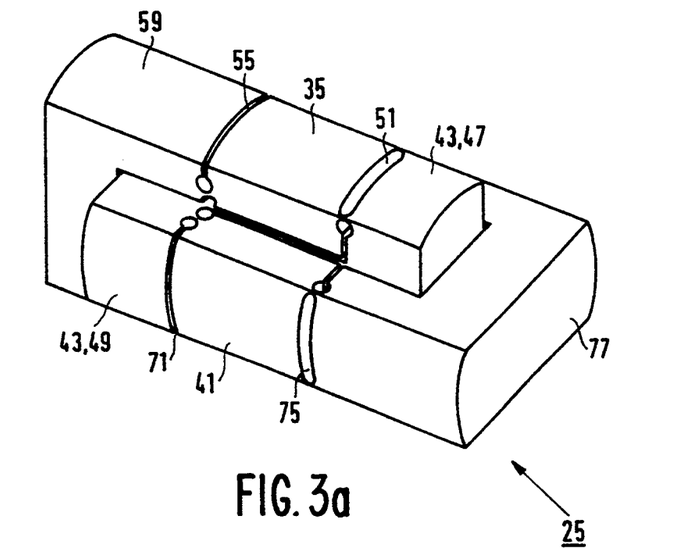
Figure 3B:
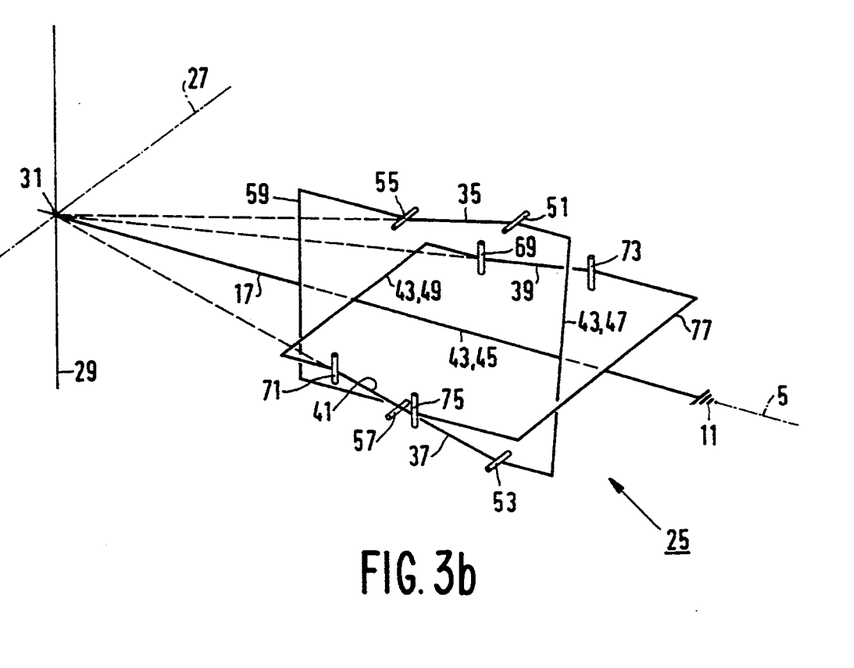
Figure 3C:
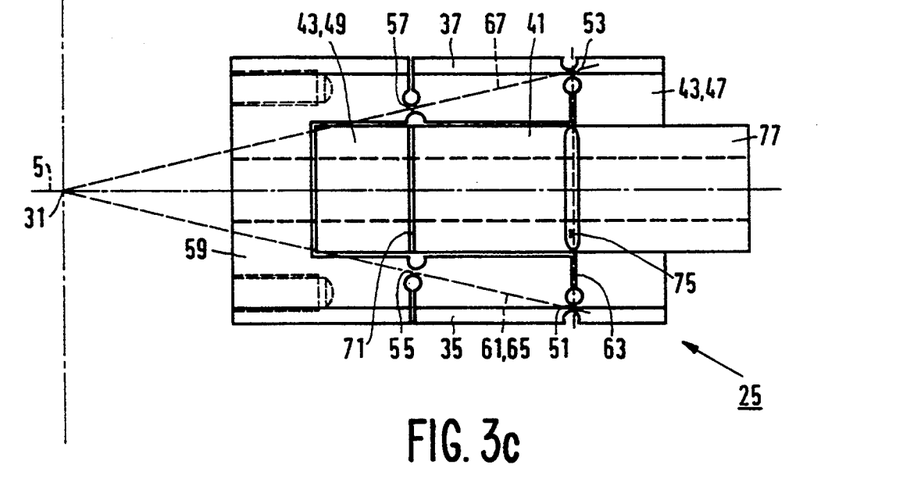

As is visible in FIG. 3b, the bridge portion 43 comprises a core 45 arranged between the four rods 35, 37, 39, 41, and two bridges 47 and 49 crossing one another and arranged near the two respective ends of the core 45. The bridges 47 and 49 are also partly visible in FIGS. 3a, 3c and 3d. As is evident from FIGS. 3b and 3c, the first and the second rods 35, 37 are each coupled to the bridge 47 of the bridge portion 43 by means of an elastically deformable perforation-defined hinge 51, 53 and is coupled to a first fastening portion 59 of the coupling member 25, by which the coupling member 25 is fastened to the support member 17 and which partly surrounds the bridge 49, by means of an elastically deformable perforation-defined hinge 55, 57. The perforation-defined hinges 51, 53 and 55, 57 extend parallel to the pivot axis 27 and are arranged in accordance with the angles of a first parallelogram 61 in the center plane of the rods 35 and 37, as is shown in FIG. 3c, the base line 63 of said first parallelogram extending parallel to the pivot axis 29 and the non-parallel sides 65 and 67 having a virtual point of intersection which coincides with the point of intersection 31.

Figure 3D:
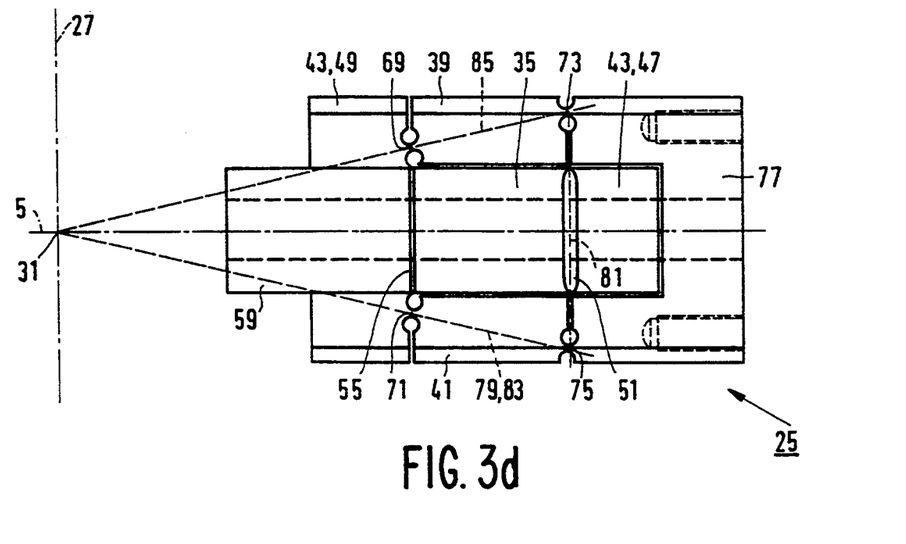

As is further visible in FIGS. 3b and 3d, the third and the fourth rod 39 and 41 are each coupled to the bridge 49 of the bridge portion 43 by means of an elastically deformable perforation-defined hinge 69, 71 and to a second fastening part 77 of the coupling member 25 by means of an elastically deformable perforation-defined hinge 73, 75, by which second fastening part the coupling member 25 is fastened to the frame 11 of the device 1 and which second fastening part partly surrounds the bridge 47. The perforation-defined hinges 69, 71 and 73, 75 extend parallel to the pivot axis 29 and are arranged according to the angles of a second parallelogram as seen in the center plane of the rods 39 and 41, as shown in FIG. 3d, the base line 81 of this parallelogram extending parallel to the pivot axis 27 and the non-parallel sides 83 and 85 having a virtual point of intersection which again coincides with the point of intersection 31. It is noted that one of the two four-rod mechanisms is formed by the first and second rod 35, 37, the bridge 47 and the first fastening part 59, while the other four-rod mechanism is formed by the third and fourth rod 39, 41, the bridge 49 and the second fastening part 77, the two four-rod mechanisms being coupled to one another through the core 45.

Figure 4:
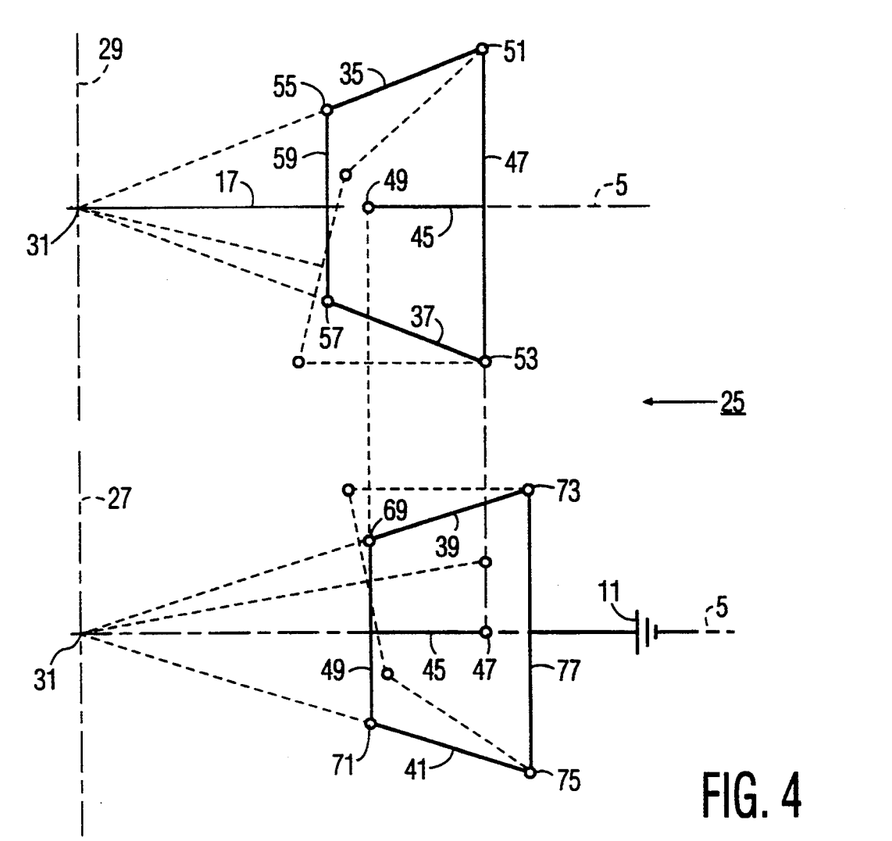
FIG. 4 diagrammatically shows the elastic deformation of the coupling member of FIG. 3a, FIG. 5 shows an alternative embodiment of a coupling member of the device of FIG. 1 or 2.

FIG. 4 diagrammatically shows how the elastic deformation of the coupling member 25 takes place. The bridge 49 together with the core 45 and the bridge 47 is pivotable through a limited angle relative to the second fastening part 77 about the pivot axis 29 under elastic deformation of the perforation-defined hinges 69, 71 and 73, 75. Furthermore, the first fastening part 59 is pivotable through a limited angle relative to the bridge 47 about the pivot axis 27 under elastic deformation of the perforation-defined hinges 52, 53 and 55, 57. The first fastening part 59 with the support member 17 is thus pivotable through a limited angle relative to the second fastening part 77 and the frame 11 of the device 1 both about the pivot axis 27 and about the pivot axis 29, so that the bearing surface 19 of the support member 17 is self-adjusting relative to the bearing surface 15 of the shaft 3.

As is evident from the above, a pivoting movement of the support member 17 takes place under elastic deformation of the perforation-defined hinges of the coupling member 25. The pivoting movement, accordingly, leads to elastic deformation forces only in the coupling member 25 and to substantially no friction or damping forces. The pivoting movement of the bearing surface 19 as a result is substantially free from hysteresis, so that the bearing surface 19 can follow the said swinging movement of the bearing surface 15 substantially without phase difference even at high speeds of the shaft 3 and a vibration of the shaft 3, in axial direction is prevented.

It is further evident from the above that the position of each of the two pivot axes 27, 29 is determined by the positions of the perforation-defined hinges of a respective pair of rods 35, 37 and 39, 41. For limited pivoting angles of the support member 17 occurring as a result of the deviation from perpendicularity of the bearing surfaces 15 and 19, the positions of the pivot axes 27, 29 can be accurately determined by means of the perforation-defined hinges of the coupling member 25, which may be formed through the provision of drilled holes and incisions in an accurate and simple manner.

It is further noted that the coupling member 25 is readily manufactured from a single piece of material. The coupling member 25 in this case is manufactured through the provision of incisions between the rods 35, 37, 39, 41 and the core 45, incisions between the rods 35, 37 and the bridge 47 and between the rods 35, 37 and the first fastening part 59, incisions between the rods 39, 41 and the bridge 49 and between the rods 39, 41 and the second fastening part 77, incisions between the first fastening part 59 and the bridge 49, incisions between the second fastening part 77 and the bridge 47, and drilled holes at the areas of the desired perforation-defined hinges. The coupling member 25 thus formed as two interlocking chain links has minimal dimensions and a high torsional stiffness relative to the axis of rotation 5.

Figure 2:
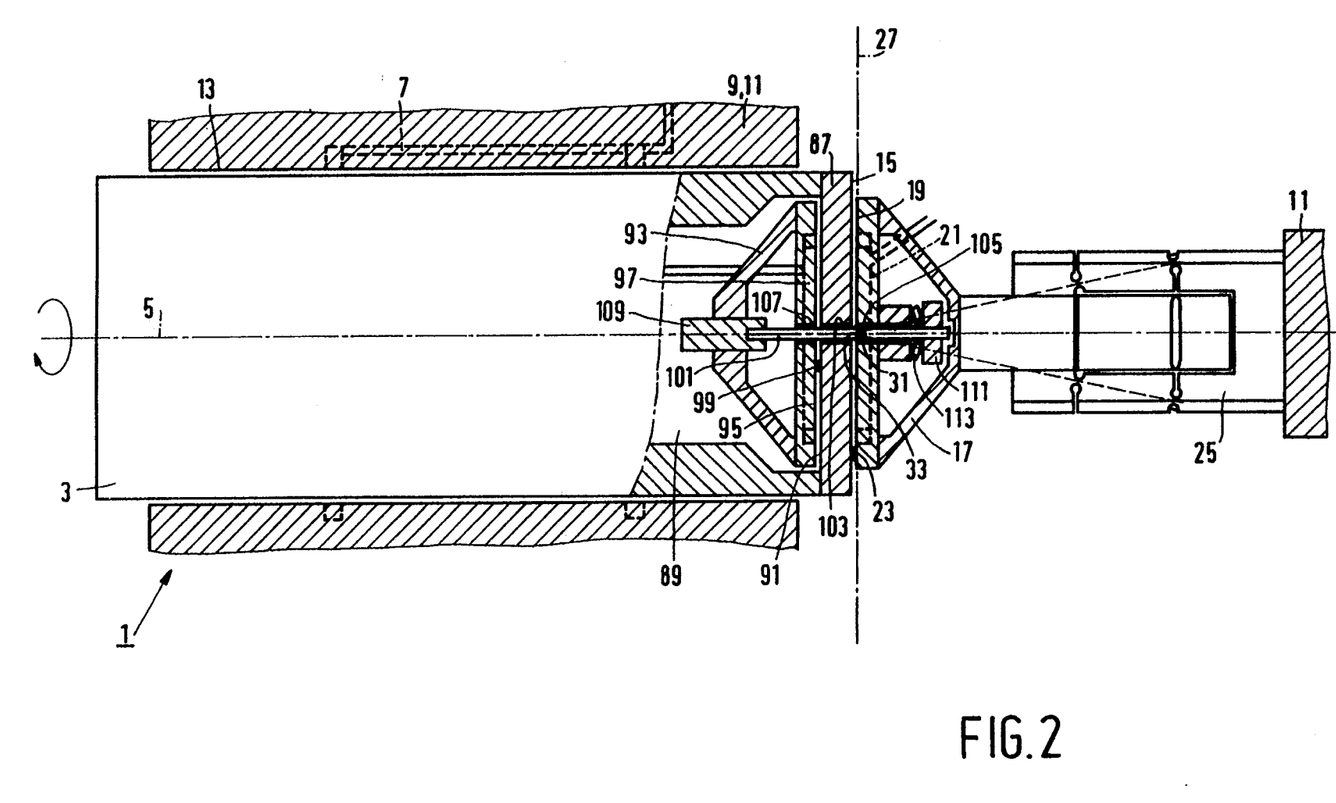
FIG. 2 shows a second embodiment of such a device.

FIG. 2 shows a second embodiment of the device 1 according to the invention. The components which correspond to the first embodiment shown in FIG. 1 are given corresponding reference numerals. In the device 1 shown in FIG. 2, the shaft 3 is provided with a bearing plate 87 which closes off a chamber 89 of the shaft 3. The bearing plate 87 is provided at the outside with the beating surface 15 which is to cooperate with the bearing surface 19 and the static fluid bearing 21 of the support member 17. On the inside, the bearing plate 87 is provided with a further bearing surface 91 which also extends perpendicular to the axis of rotation 5. A further support member 93 is also provided in the chamber 89, similar to the support member 17 provided with a bearing surface 95 extending perpendicular to the axis of rotation 5, and provided with a static fluid bearing 97 which maintains a bearing gap 99 between the bearing surfaces 91 and 95 during operation. The further support member 93 is coupled to the support member 17 by means of a flexible tension rod 101 which extends through an opening 103 in the bearing plate 87 and through openings 105 and 107 in the support members 17 and 93. One of the ends of the tension rod 101 is screwed into a holder 109 of the further support member 93, while the other end of the tension rod 101 is provided with a tensioning nut 111 which is prestressed by a cup spring 113 arranged in the support member 17. The shaft 3 is prestressed in axial direction by means of the further support member 93 and the static fluid bearing 97, the further support member 93 being capable of following a deviation from perpendicularity of the bearing surfaces 91 and 95 relative to the axis of rotation 5 owing to the use of the flexible tension rod 101. In contrast to the support member 17, the further support member 93 has no accurately defined pivot axes. The accuracy with which the shaft 3 is supported in axial direction, however, is determined by the support member 17, while the further support member 93 exerts only a comparatively small necessary prestressing force whose value follows from the stiffness of the cup spring 113.

Figure 5:
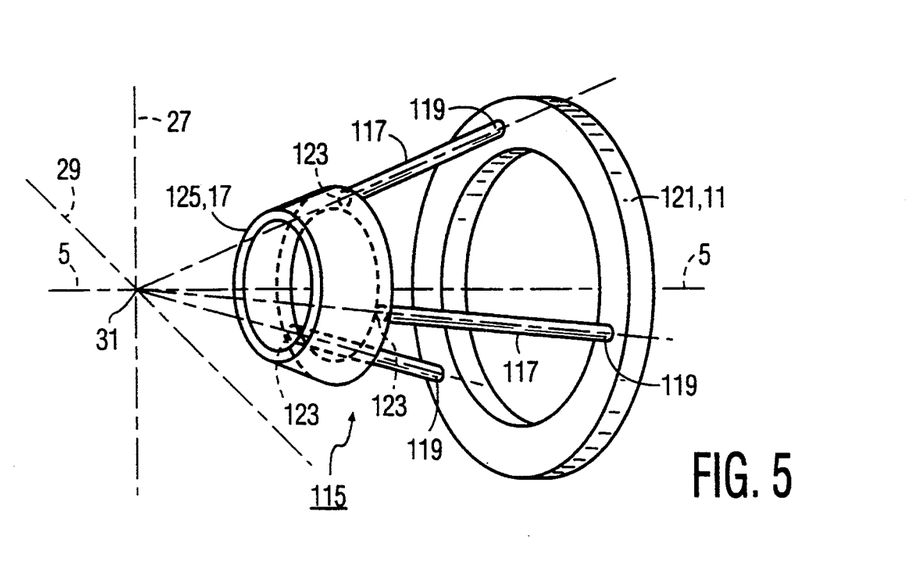

Instead of the elastically deformable coupling member 25, the device 1 shown in FIGS. 1 and 2 may comprise an alternative elastically deformable coupling member such as, for example, the coupling member 115 shown in FIG. 5. The coupling member 115 comprises three elastically deformable flexible metal rods 117. The ends 119 of the rods 117 facing towards the frame 11 of the device 1 are fastened with regular interspacings to a mounting ring 121 of the frame 11, the center of which lies on the axis of rotation 5. The ends 123 of the rods 117 facing towards the support member 17 are fastened, also with regular interspacings, to a mounting ring 125 of the support member 17 whose center also lies on the axis of rotation 5. The three rods 117 intersect in a virtual point of intersection which coincides with the point of intersection 31 of the axis of rotation 5 and the bearing surface 19. The use of the three elastically deformable flexible rods 117 defines the position of the point of intersection 31 in axial and radial direction relative to the frame 11. The support member 17, however, is pivotable through limited angles relative to the fixedly arranged mounting ring 121 about each pivot axis, which is perpendicular to the axis of rotation 5 and passes through the point of intersection 31, and can also be twisted through limited angles about the axis of rotation 5. Thus, the support member 17 can again follow an inaccuracy in the perpendicularity of the beating surfaces 15 and 19 relative to the axis of rotation 5 through the use of the coupling member 115 with the rods 117. Since exclusively elastic deformation forces and substantially no friction or damping forces occur in the coupling member 115 during pivoting of the support member 17, the support member 17 can follow the said swinging movement of the bearing surface 15, and axial vibrations of the shaft 3 are prevented. Twisting of the support member 17 about the axis of rotation 5 takes place through comparatively small angles as a result of the viscous friction which occurs in the bearing gap 23 during rotation of the shaft 3 and has a negligible influence on the position of the point of intersection 31 and the axial accuracy of the device 1.

Figure 6:
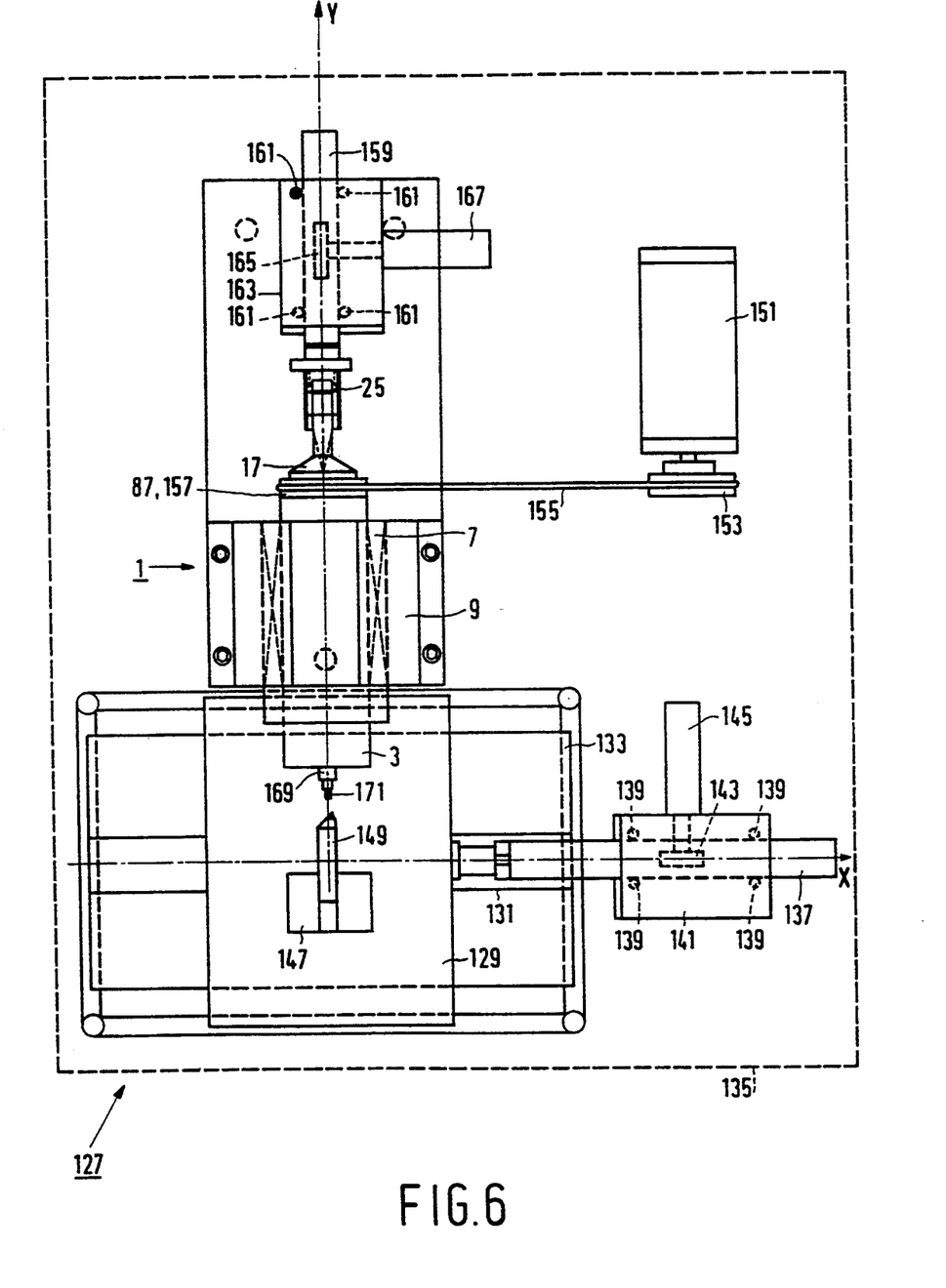
FIG. 6 shows a positioning device according to the invention, provided with a device as shown in FIG. 1 or 2.

The device 1 shown in FIG. 2 is used in the positioning device 127 of FIG. 6. The positioning device 127 comprises a slide 129 which is displaceable parallel to an X-direction shown in FIG. 6. The slide 129 is for this purpose provided with a static fluid bearing (not visible in the figure) by which the slide 129 is guided along a straight guide 131 which extends parallel to the X-direction and which is provided in a guide block 133 of a frame 135 of the positioning device 127. The slide 129 is further provided with a drive rod 137 which is guided along a number of guide wheels 139 in a housing 141 and which can be driven in the X-direction by means of a friction wheel 143 which is coupled to an electric motor 145 fastened to the housing 141. A holder 147 for a tool such as, for example, a cutting tool 149 shown in FIG. 6, is present on the slide 129.

The shaft 3 of the device 1 used in the positioning device 127 extends parallel to a Y-direction which is perpendicular to the X-direction and is supported with rotation possibility relative to the frame 135 by means of the static fluid bearing 7 and the bearing block 9. The shaft 3 can be rotated by an electric motor 151 which is coupled to the shaft 3 via a pulley 153, a rope 155 and a pulley 157 which is integral with the bearing plate 87 of the shaft 3.

The support member 17 by which the shaft 3 is supported parallel to the Y-direction is coupled to a further drive rod 159 by means of the elastically deformable coupling member 25. The drive rod 159 is guided along a number of guide wheels 161 in a housing 163 which is fastened to the frame 135, and can be driven by a friction wheel 165 coupled to an electric motor 167 fastened to the housing 163. The rotatable shaft 3, the support member 17, the coupling member 25 and the drive rod 159 are jointly displaceable parallel to the Y-direction by means of the electric motor 167 and the friction wheel 165, the shaft 3 being guided in the bearing block 9. The rope 55 has a sufficient elasticity so as to be able to follow a displacement of the shaft 3 and the pulley 157 parallel to the Y-direction.

As is further shown in FIG. 6, the shaft 3 is provided with a holder 169 for a workpiece at and end facing the slide 129. The holder 169 shown in FIG. 6 is suitable for holding a contact lens 171 to be machined by the cutting tool 149. During operation, the cutting tool 149 is moved parallel to the X-direction by the motor 145, while the contact lens 171 is made to rotate by the motor 151 and is moved parallel to the Y-direction by the motor 167. The contact lens 171 is given a desired optical shape in this manner by means of the positioning device 127. Since the displacements of the cutting tool 149 relative to the contact lens 171 parallel to the X-direction and the Y-direction are directly guided along the frame 135 by separate means (guide block 133 and beating block 9), a particularly stiff construction of the positioning device 127 is achieved as well as a high accuracy of the optical shape to be provided. Vibrations of the shaft 3 parallel to the Y-direction are prevented through the support of the shaft 3 parallel to the Y-direction by means of the device 1 with the coupling member 25, which vibrations, as was set out above, would arise without the use of the coupling member 25 as a result of the deviation from perpendicularity of the bearing surfaces 15 and 19 relative to the axis of rotation 5 and would lead to undesirable or inadmissible deviations in the accuracy of the desired optical shape of the contact lens 171.

In the device 1 shown in FIGS. 1 and 2, the support member 17 is provided with a static fluid bearing 21. It is noted that a dynamic fluid bearing may alternatively be used instead of a static fluid bearing, for example, a spiral groove bearing in which one of the bearing surfaces 15, 19 is provided with a pattern of spiralling grooves.

In the device 1 shown in FIGS. 1 and 2, furthermore, the bearing surface 19 of the support member 17 is pivotable by means of the coupling member 25. The said undesirable vibration of the shaft 3 may alternatively be prevented in that the coupling member 25 is fastened between the shaft 3 and the bearing surface 15 of the shaft 3, in which case the bearing surface 15 is pivotable about two mutually perpendicular pivot axes which have a point of intersection which coincides with a point of intersection of the axis of rotation 5 and the bearing surface 15. It is also possible to give each of the two bearing surfaces 15 and 19 a pivoting possibility by means of separate coupling members 25.

The support member 17 in the device 1 is constructed as an aerostatically supported foot. It is noted that the support member 17 may also have an alternative construction, depending on the type of fluid beating used. For example, if the bearing surface 15 of the shaft 3 is pivotable and a dynamic fluid beating is used, the support member may be constructed as a simple frame support which acts as a carrier for the bearing surface 19.

The device 1 may be used, besides in the positioning device 127 shown in FIG. 6, also in other positioning devices, machining devices or machine tools in which an accurate and vibration-free axial support of a rotatable shaft or different body by means of an axial fluid bearing is desired or required. In addition, such a device may also be used for the axial support of rotating machine or motor parts which have a comparatively great mass such as, for example, turbines of jet engines or generators.

We claim:

1. A device for supporting a rotatable body in a direction parallel to an axis of rotation of the body, the device comprising a support member with a bearing surface and a fluid bearing comprising two cooperating bearing surfaces which extend transverse to the axis of rotation and which are present on the body and on the support member, respectively, one of the bearing surfaces being pivotable about two mutually perpendicular pivot axes which extend perpendicular to the axis of rotation and the relevant bearing surface, characterized in that:

the bearing surface is pivotable by means of an elastically deformable coupling member, the point of intersection of the axis of rotation, the pivot axes and the bearing surface being defined in relation to the axis of rotation by means of the coupling member.

2. A device as claimed in claim 1, characterized in that the pivot axes are defined by elastic hinges of the coupling member.

3. A device as claimed in claim 2, characterized in that the coupling member acts as two coupled four-rod mechanisms, the two pivot axes being each defined by a separate four-rod mechanism which extends in a plane perpendicular to the corresponding pivot axis and is provided with four elastic hinges each having a hinge axis extending parallel to the corresponding pivot axis, while the hinges of each four-rod mechanism, seen in the relevant plane, are arranged according to the angles of a parallelogram whose non-parallel sides have a virtual point of intersection which coincides with the point of intersection of the axis of rotation and the bearing surface.

4. A device as claimed in claim 3, characterized in that the four-rod mechanisms are arranged mutually crosswise, while the hinges of the two four-rod mechanisms situated on the base lines of the parallelograms and the hinges of the two four-rod mechanisms remote from the base lines are arranged in two respective parallel planes which extend perpendicular to the axis of rotation, while a core is present between the four-rod mechanisms which connects a bridge of one of the four-rod mechanisms arranged near the base line with a bridge of the other four-rod mechanism situated remote from the base line.

5. A device as claimed in claim 4, characterized in that the rotatable body is prestressed in the direction parallel to the axis of rotation by means of a further fluid bearing with a bearing surface which is present on a further support member of the device, while the support member and the further support member are arranged on either side of the plate-shaped bearing part of the body extending perpendicular to the axis of rotation and are coupled by means of a flexible tension rod.

6. A device as claimed in claim 3, characterized in that the rotatable body is prestressed in the direction parallel to the axis of rotation by a further fluid bearing with a bearing surface which is present on a further support member of the device, while the support member and the further support member are arranged on either side of the plate-shaped bearing part of the body extending perpendicular to the axis of rotation and are coupled by a flexible tension rod.

7. A device as claimed in claim 1, characterized in that the coupling member comprises three elastically deformable rods which have a virtual point of intersection which coincides with the point of intersection of the axis of rotation and the bearing surface.

8. A device as claimed in claim 5, characterized in that the rotatable body is prestressed in the direction parallel to the axis of rotation by means of a further fluid bearing with a bearing surface which is present on a further support member of the device, while the support member and the further support member are arranged on either side of a plate-shaped bearing part of the body extending perpendicular to the axis of rotation and are coupled by means of a flexible tension rod.

9. A device as claimed in claim 1, characterized in that the rotatable body is prestressed in the direction parallel to the axis of rotation by a further fluid bearing with a bearing surface which is present on a further support member of the device, while the support member and the further support member are arranged on either side of the plate-shaped bearing part of the body extending perpendicular to the axis of rotation and are coupled by a flexible tension rod.

10. A device as claimed in claim 2, characterized in that the rotatable body is prestressed in the direction parallel to the axis of rotation by a further fluid bearing with a bearing surface which is present on a further support member of the device, while the support member and the further support member are arranged on either side of the plate-shaped bearing part of the body extending perpendicular to the axis of rotation and are coupled by a flexible tension rod.

11. A positioning device, comprising:

a support device for supporting a rotatable body in a direction parallel to an axis of rotation of the body, the support device including a support member and a fluid bearing comprising two cooperating bearing surfaces which extend transverse to the axis of rotation and which are present on the body and on the support member of the device, respectively, one of the bearing surfaces being pivotable about two mutually perpendicular pivot axes which extend perpendicular to the axis of rotation and which intersect one another in a point of intersection of the axis of rotation and the relevant bearing surface, the bearing surface being pivotable by means of an elastically deformable coupling member, the point of intersection of the axis of rotation, the pivot axes and the bearing surface being defined in relation to the axis of rotation by means of the coupling member;

a slide which is movable parallel to an X-direction and comprises a holder for a tool; and a shaft which extends parallel to a Y-direction perpendicular to the X-direction and which is rotatable about an axis of rotation directed parallel to the Y-direction, the shaft being supported parallel to the Y-direction by means of said support device and being displaceable parallel to the Y-direction together with said support device, said shaft including a holder for a workpiece adjacent an end facing the slide.

12. A device as claimed in claim 7, characterized in that the pivot axes are defined by elastic hinges of the coupling member.

13. A device as claimed in claim 12, characterized in that the rotatable body is prestressed in the direction parallel to the axis of rotation by a further fluid bearing with a bearing surface which is present on a further support member of the device, while the support member and the further support member are arranged on either side of a plate-shaped bearing part of the body extending perpendicular to the axis of rotation and are coupled by a flexible tension rod.

14. A device as claimed in claim 11 characterized in that the coupling member acts as two coupled four-rod mechanisms, the two pivot axes being each defined by a separate four-rod mechanism which extends in a plane perpendicular to the corresponding pivot axis and is provided with four elastic hinges each having a hinge axis extending parallel to the corresponding pivot axis, while the hinges of each four-rod mechanism, seen in the relevant plane, are arranged according to the angles of the parallelogram whose non-parallel sides have a virtual point of intersection which coincides with the point of intersection of the axis of rotation and the bearing surface.

15. A device as claimed in claim 14, characterized in that the four-rod mechanisms are arranged mutually crosswise, while the hinges of the two four-rod mechanisms situated on the base lines of the parallelograms and the hinges of the two four-rod mechanisms remote from the base lines are arranged in two respective parallel planes which extend perpendicular to the axis of rotation, while a core is present between the four-rod mechanisms which connects a bridge of one of the four-rod mechanisms arranged near the base line with a bridge of the other four-rod mechanism situated remote from the base line.

16. A device as claimed in claim 15, characterized in that the rotatable body is prestressed in the direction parallel to the axis of rotation by a further fluid bearing with a bearing surface which is present on a further support member of the device, while the support member and the further support member are arranged on either side of a plate-shaped bearing part of the body extending perpendicular to the axis of rotation and are coupled by a flexible tension rod.

17. A device as claimed in claim 14, characterized in that the rotatable body is prestressed in the direction parallel to the axis of rotation by a further fluid bearing with a bearing surface which is present on a further support member of the device, while the support member and the further support member are arranged on either side of a plate-shaped bearing part of the body extending perpendicular to the axis of rotation and are coupled by a flexible tension rod.

18. A device as claimed in claim 11, characterized in that the coupling member comprises three elastically deformable rods which have a virtual point of intersection which coincides with the point of intersection of the axis of rotation and the bearing surface.

19. A device as claimed in claim 18, characterized in that the rotatable body is prestressed in the direction parallel to the axis of rotation by a further fluid bearing with a bearing surface which is present on a further support member of the device, while the support member and the further support member are arranged on either side of a plate-shaped bearing part of the body extending perpendicular to the axis of rotation and are coupled by a flexible tension rod.

20. A device as claimed in claim 11, characterized in that the rotatable body is prestressed in the direction parallel to the axis of rotation by a further fluid bearing with a bearing surface which is present on a further support member of the device, while the support member and the further support member are arranged on either side of a plate-shaped bearing part of the body extending perpendicular to the axis of rotation and are coupled by a flexible tension rod.

* * * * *